UNITED STATES PATENT OFFICE.

AUGUSTIN RADISSON AND PAUL BERTHON, OF LYON, FRANCE; SAID RADISSON ASSIGNOR OF HIS RIGHT TO SOCIETE DE STEARINERIE ET SAVONNERIE DE LYON, OF LYON, FRANCE.

PROCESS FOR PRODUCING CATALYTIC AGENTS FOR REDUCTION OR HYDROGENATION PURPOSES.

1,377,158.     Specification of Letters Patent.     Patented May 3, 1921.

No Drawing.     Application filed October 29, 1919. Serial No. 334,331.

*To all whom it may concern:*

Be it known that we, AUGUSTIN RADISSON and PAUL BERTHON, both residing at Lyon, in France, and citizens of the French Republic, have invented a certain new and useful Process for Producing Catalytic Agents for Reduction or Hydrogenation Purposes, of which the following is a specification.

The invention relates to a process for producing catalytic agents for reduction or hydrogenation purposes.

A great number of processes have been suggested for obtaining catalyzers for reduction or hydrogenation.

Some advocate the use of certain refined metals, others utilize the catalytic properties of certain oxids.

It is also known that if during the reduction of certain oxids or certain metallic salts a suboxid appears to be temporarily formed, the final result of such reduction is invariably the metal. It is admitted, on the other hand, that the catalytic properties of a reduced metal are increased proportionately with the low temperature at which it was reduced.

It seems, therefore, logical to endeavor to obtain the whole of the catalyzer in its most stable and most active form.

According to the present invention an oxid or salt of a metal (nickel, cobalt, manganese, copper, etc.) is reduced in a neutral liquid medium having a high boiling point, such as solid paraffin, petroleum jelly, heavy petroleum oil, etc., in the presence of a trace of free fatty acid.

Practically, for instance, oxid of precipitated nickel, pure and dry, is held in suspension in melted paraffin, and a slight proportion of stearic acid is added to the mixture in such manner that its acidity does not exceed 0.3 per cent. of the total weight of the mixture. The acid lowers the required working temperature.

The reagents are kept during the operation at the temperature of 250° and perfect contact between the gas and the mixture of oxid with the paraffin, or the like, in melted condition is insured by suitable means. The liquid or medium is maintained, during the preparation, in a liquid state by heat, and is constantly agitated by passing a current of hydrogen gas through it.

At the end of from 2½ to 3 hours the nickel is completely in the metallic state. It is then present in the form of an absolutely impalpable black powder. It is dried hot to separate it from the paraffin, and cakes are thus obtained containing a very large proportion of nickel which is never less than 90%, the balance or 10% being formed by suboxid or oxid of nickel. Under this covering of paraffin the catalyzer is indefinitely preserved without losing any of its efficiency.

What we claim as our invention and desire to secure by Letters Patent of the United States is:—

1. A process for producing catalytic agents for reduction or hydrogenation purposes, consisting in reducing a metallic oxid in a mixture of a neutral liquid having a high boiling point and a small proportion of free fatty acid, the said mixture being maintained in a liquid state by heat during the reduction, and constantly agitated by passing a current of hydrogen gas through it.

2. The process of producing catalytic agents for reduction or hydrogenation purposes, consisting in reducing an oxid or a salt of a catalytic metal in a medium composed of a chemically neutral saturated body not containing oxygen in its composition and a slight proportion of stearic acid; the said medium being maintained in a liquid state by heat during the reduction, and constantly agitated by passing hydrogen gas through it.

3. The herein described process of producing catalytic agents for reduction or hydrogenation purposes; consisting in reducing an oxid or a salt of a catalytic metal in a heated medium composed of petroleum jelly and a slight proportion of stearic acid; the said medium being maintained in a liquid state during the process at a temperature of approximately 250°, and constantly agitated by passing a current of hydrogen gas through it; then separating the catalytic agent in the form of a fine powder from the solution; and finally drying the separated agent while hot.

In witness whereof we have signed this specification in the presence of two witnesses.

AUGUSTIN RADISSON.
PAUL BERTHON.

Witnesses:
    JEAN GERMAIN,
    LOUIS ESCHER.